United States Patent [19]
Hüffer et al.

[11] Patent Number: 6,107,231
[45] Date of Patent: Aug. 22, 2000

[54] ZIEGLER-NATTA CATALYST SYSTEMS MODIFIED DURING THEIR PREPARATION

[75] Inventors: Stephan Hüffer, Ludwigshafen; Ulrich Moll, St Martin; Peter Kölle, Bad Dürkheim; Roland Hingmann, Ladenburg, all of Germany

[73] Assignee: BASF Aktiengesellschaft, Ludwigshafen, Germany

[21] Appl. No.: 08/928,526

[22] Filed: Sep. 12, 1997

[30] Foreign Application Priority Data

Sep. 13, 1996 [DE] Germany ............... 196 37 367

[51] Int. Cl.[7] ................................. B01J 38/56
[52] U.S. Cl. ................ 502/118; 502/120; 502/103; 502/104; 526/130; 526/158
[58] Field of Search .................. 502/120, 103, 502/104, 118; 526/130, 158

[56] References Cited

U.S. PATENT DOCUMENTS

| | | | |
|---|---|---|---|
| 4,816,433 | 3/1989 | Terano et al. | 526/124.9 |
| 4,857,613 | 8/1989 | Zolk et al. | |
| 4,970,186 | 11/1990 | Terano et al. | 526/903 |
| 5,162,465 | 11/1992 | Kerth et al. | 526/124.6 |
| 5,288,824 | 2/1994 | Kerth et al. | |
| 5,744,567 | 4/1998 | Huffer et al. | 526/124.6 |

FOREIGN PATENT DOCUMENTS

| | | |
|---|---|---|
| 171 200 | 2/1986 | European Pat. Off. . |
| 530 599 | 3/1993 | European Pat. Off. . |
| 195 17716 | 12/1995 | European Pat. Off. . |
| 42 16 548 | 11/1993 | Germany . |
| 2 111 066 | 6/1983 | United Kingdom . |

*Primary Examiner*—David W. Wu
*Assistant Examiner*—Ling-Siu Choi
*Attorney, Agent, or Firm*—Keil & Weinkauf

[57] ABSTRACT

In catalyst systems of the Ziegler-Natta type comprising as active constituents a) a titanium-containing solid component which is obtained by reacting a compound of titanium with a compound of magnesium, a halogen, an inorganic oxide as support, a $C_1$–$C_8$-alkanol and a carboxylic ester as electron donor compound, and also as cocatalyst, b) an aluminum compound and c) if desired, a further electron donor compound, the reaction of the individual components for preparing the titanium-containing solid component a) is carried out in the presence of an aromatic hydrocarbon as solvent.

6 Claims, No Drawings

ZIEGLER-NATTA CATALYST SYSTEMS MODIFIED DURING THEIR PREPARATION

The present invention relates to Ziegler-Natta catalyst systems modified during their preparation and comprising as active constituents a) a titanium-containing solid component which is obtained by reacting a compound of titanium with a compound of magnesium, a halogen, an inorganic oxide as support, a $C_1$–$C_8$-alkanol and a carboxylic ester as electron donor compound, and also, as cocatalyst, b) an aluminum compound and c) if desired, a further electron donor compound, wherein the reaction of the individual components for preparing the titanium-containing solid component a) is carried out in the presence of an aromatic hydrocarbon as solvent.

In addition, the invention provides a process for preparing such Ziegler-Natta catalyst systems, the preparation of polymers of propylene with the aid of these catalyst systems, the polymers obtainable in this way and films, fibers and moldings comprising these polymers.

Catalyst systems of the Ziegler-Natta type are known, inter alia, from DE-A 42 16 548, DE-A 44 19 438, EP-A 530 599 and U.S. Pat. No. 4,857,613. These systems are used, in particular, for the polymerization of $C_2$–$C_{10}$-alk-1-enes and comprise, inter alia, compounds of polyvalent titanium, aluminum halides and/or alkyls, and also electron donor compounds, in particular silicon compounds, ethers, carboxylic esters, ketones and lactones which are used both in connection with the titanium component and as cocatalyst.

The Ziegler-Natta catalysts are customarily prepared in two steps. The titanium-containing solid component is prepared first and is subsequently reacted with the cocatalyst. The polymerization is subsequently carried out with the aid of the catalysts thus obtained.

U.S. Pat. No. 4,857,613 and U.S. Pat. No. 5,288,824 describe catalyst systems of the Ziegler-Natta type which contain a titanium-containing solid component and an aluminum compound and also organic silane compounds as electron donor compounds. The catalyst systems obtained in this way display, inter alia, a good productivity and give polymers of propylene having a high stereospecificity, i.e. a high isotacticity, a low chlorine content and a good morphology, i.e. a low proportion of fines.

According to U.S. Pat. No. 4,857,613 and U.S. Pat. No. 5,288,824, the titanium-containing solid component is prepared in two steps, with a catalyst precursor still containing interfering accompanying substances or by-products being prepared first in an inorganic aliphatic hydrocarbon, generally heptane. Subsequent to this first step, the by-products are customarily leached from the catalyst precursor using a mixture of an aromatic hydrocarbon and titanium tetrachloride. This purification of the catalyst precursor is frequently only incomplete, resulting in considerable losses in catalyst productivity. In addition, quality fluctuations attributable to insufficient removal of the by-products from the titanium-containing solid component are occasionally observed in the industrial preparation of such catalyst systems.

It is an object of the present invention to develop, starting from the catalyst systems described in U.S. Pat. No. 4,857,613 and U.S. Pat. No. 5,288,824, further improved catalyst systems which display, inter alia, an increased productivity and have a constant good quality.

We have found that this object is achieved by the catalyst systems of the Ziegler-Natta type defined in the introduction.

The catalyst systems of the present invention comprise, inter alia, a titanium-containing solid component a) and also a cocatalyst. A suitable cocatalyst is the aluminum compound b). Preferably, apart from this aluminum compound b), an electron donor compound c) is also used as a further constituent of the cocatalyst.

To prepare the titanium-containing solid component a), the titanium compounds used are generally halides or alkoxides of trivalent or tetravalent titanium, with the chlorides of titanium, in particular titanium tetrachloride, being preferred. The titanium-containing solid component further comprises a support.

Furthermore, among other things, compounds of magnesium are used for preparing the titanium-containing solid component. Suitable magnesium compounds are, in particular, magnesium halides, magnesium alkyls and magnesium aryls, and also magnesium alkoxy and magnesium aryloxy compounds, with preference being given to using magnesium dichloride, magnesium dibromide and di($C_1$–$C_{10}$-alkyl)magnesium compounds. In addition, the titanium-containing solid component can further comprise halogen, preferably chlorine or bromine.

In addition, the titanium-containing solid component a) further comprises electron donor compounds, for example monofunctional or polyfunctional carboxylic acids, carboxylic anhydrides and carboxylic esters, also ketones, ethers, alcohols, lactones and organophosphorus and organosilicon compounds. As electron donor compounds within the titanium-containing solid component, preference is given to using phthalic acid derivatives of the formula (II)

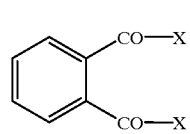

(II)

where X and Y are each a chlorine atom or a $C_1$–$C_{10}$-alkoxy radical or together are oxygen. Particularly preferred electron donor compounds are phthalic esters where X and Y are each a $C_1$–$C_8$-alkoxy radical, for example a methoxy, ethoxy, propyloxy or butyloxy radical.

Further preferred electron donor compounds within the titanium-containing solid components are, inter alia, diesters of 3- or 4-membered, substituted or unsubstituted cycloalkyl-1,2-dicarboxylic acids, and also monoesters of substituted or unsubstituted benzophenone-2-carboxylic acids. Hydroxy compounds used in these esters are the alcohols customary in esterification reactions, for example $C_1$–$C_{15}$-alkanols, $C_5$–$C_7$-cycloalkanols which may in turn bear $C_1$–$C_{10}$-alkyl groups, also $C_6$–$C_{10}$-phenols.

The titanium-containing solid component can be prepared by methods known per se. Examples of such methods are described, inter alia, in EP-A 171 200, GB-A 2 111 066, U.S. Pat. No. 4,857,613 and U.S. Pat. No. 5,288,824.

In the preparation of the titanium-containing solid component a), the following two-stage process is preferably employed:

In the first stage, an inorganic oxide generally having a pH of from 1 to 6.5, a mean particle diameter of from 5 to 200 μm, in particular from 20 to 70 μm, a pore volume of from 0.1 to 10 cm³/g, in particular from 1.0 to 4.0 cm³/g, and a specific surface area of from 10 to 1000 m²/g, in particular from 100 to 500 m²/g, is first admixed with a solution of the magnesium-containing compound in a liquid alkane, after which this mixture is stirred for from 0.5 to 5 hours at from 10 to 120° C. Preference is given to using from 0.1 to 1 mol of the magnesium compound per mol of the support. Subsequently, while stirring continually, a halogen or a hydrogen halide, in particular chlorine or hydrogen chloride, is added in an at least twofold, preferably at least fivefold, molar excess, based on the magnesium-containing compound. The individual components are here reacted in the presence of an aromatic hydrocarbon, preferably a $C_7$–$C$ . . . -alkylbenzene, in particular ethylbenzene. After from about 30 to 120 minutes, a $C_1$–$C_8$-alkanol, in particular ethanol, a halide or alkoxy of trivalent or tetravalent titanium, in particular titanium tetrachloride, and also an electron donor compound are added to this reaction product at from 10 to 150° C. From 1 to 10 mol of trivalent or tetravalent titanium and from 0.01 to 1 mol, in particular from 0.1 to 0.5 mol, of the electron donor compound are used here per mol of magnesium in the solid obtained from the first stage. This mixture is stirred for at least 30 minutes at from 10 to 150° C.; the solid thus obtained is subsequently filtered off and washed with a $C_7$–$C_{10}$-alkylbenzene, preferably with ethylbenzene.

In the second stage, the solid obtained from the first stage is extracted for some hours at from 100 to 150° C. with excess titanium tetrachloride or an excess of a solution of titanium tetrachloride in an inert solvent, preferably a $C_7$–$C_{10}$-alkylbenzene, with the solvent comprising at least 5% by weight of titanium tetrachloride. The product is then washed with a liquid alkane until the titanium tetrachloride content of the washing 40 liquid is less than 2% by weight.

According to the present invention, the individual components for preparing the titanium-containing solid component a) are reacted in the presence of an aromatic hydrocarbon, in particular a $C_7$–$C_{12}$-alkylbenzene or a halogenated benzene derivative, with preference being given to using ethylbenzene. It is also possible for the solvent used to be a mixture of at least 10% by weight, in particular at least 20% by weight, of an aromatic hydrocarbon and up to 90% by weight, in particular up to 80% by weight, of an aliphatic hydrocarbon. Aliphatic hydrocarbons which may be mentioned in this context are in particular $C_5$–$C_{12}$-alkanes, preferably hexane, heptane and isododecane.

Owing to the better solubility of the interfering by-products formed in the reaction of the individual components, these are removed before the actual extraction step so that the extraction step in the subsequent second stage is very effective.

In the titanium-containing solid component a), preference is given to using, as support, a finely divided inorganic oxide having a pH of from 1 to 6.5, a mean particle diameter of from 5 to 200 µm, in particular from 20 to 70 µm, and a mean particle diameter of the primary particles of from 1 to 20 µm, in particular from 1 to 5 µm. The primary particles here are porous, granular oxide particles which are obtained by milling, if desired after appropriate sieving, from a corresponding hydrogel. The hydrogel is generated in the acid range, i.e. in a pH range of from 1 to 6.5, or else is after-treated with appropriate acid washing solutions and purified.

Furthermore, the preferred finely divided inorganic oxide also has voids and channels having a mean diameter of from 1 to 20 µm, in particular from 1 to 15 µm, and a macroscopic proportion by volume in the total particle in the range from 5 to 30%, in particular in the range from 10 to 30%. Furthermore, the finely divided inorganic oxide has, in particular, a pore volume of from 0.1 to 10 cm³/g, preferably from 1.0 to 4.0 cm³/g, and a specific surface area of from 10 to 1000 m²/g, preferably from 100 to 500 m²/g. The pH, i.e. the negative logarithm to the base ten of the proton concentration of the inorganic oxide is in the range from 1 to 6.5, in particular in the range from 2 to 5.

Preferred inorganic oxides are, in particular, oxides of silicon, aluminum, titanium or one of the metals of main groups I. and II. of the Periodic Table. Apart from aluminum oxide or magnesium oxide or a sheet silicate, a very particularly preferred oxide is silica gel ($SiO_2$), with this being able to be obtained, in particular, by spray drying. It is also possible to use cogels, i.e. mixtures of two different inorganic oxides.

The inorganic oxide is preferably present in the titanium-containing solid component a) in such amounts that from 0.1 to 1.0 mol, in particular from 0.2 to 0.5 mol, of the compound of magnesium is present per 1 mol of the inorganic oxide.

The titanium-containing solid component obtainable in this way is used together with a cocatalyst as Ziegler-Natta catalyst system. A suitable cocatalyst here is, inter alia, an aluminum compound b).

Aluminum compounds b) suitable as cocatalysts are trialkylaluminum and also compounds in which an alkyl group is replaced by an alkoxy group or by a halogen atom, preferably by chlorine or bromine. Preference is given to using trialkylaluminum compounds whose alkyl groups each have from 1 to 8 carbon atoms, for example trimethylaluminum, triethylaluminum or methyldiethylaluminum.

In addition to the aluminum compound b), preference is given to using electron donor compounds c) such as monofunctional or polyfunctional carboxylic acids, carboxylic anhydrides and carboxylic esters, also ketones, ethers, alcohols, lactones and organophosphorus and organosilicon compounds as further cocatalyst. Preferred electron donor compounds are organosilicon compounds of the formula (I)

where
R¹ are identical or different and are each a $C_1$–$C_{20}$-alkyl group, a 5- to 7-membered cycloalkyl group which can in turn bear a $C_1$–$C_{10}$-alkyl group, or a $C_6$–$C_{20}$-aryl or arylalkyl group, R² are identical or different and are each a $C_1$–$C_{20}$-alkyl group and n is 1, 2 or 3. Particular preference is here given to those compounds in which R¹ is a $C_1$–$C_8$-alkyl group or a 5- to 7-membered cycloalkyl group, and R² is a $C_1$–$C_4$-alkyl group and n is 1 or 2.

Among these compounds, particular prominence may be given to dimethoxydiisopropylsilane, dimethoxyisobutylisopropylsilane, dimethoxydiisobutylsilane, dimethoxydicyclopentylsilane, dimethoxyisobutyl-sec-butylsilane, dimethoxyisopropyl-sec-butylsilane, diethoxydicyclopentylsilane and diethoxyisobutylisopropylsilane.

The individual compounds b) and, if used, c) can be used as catalyst either individually in any order or as a mixture of two components.

The compounds b) and, if desired, c) acting as cocatalysts can be allowed to act either successively or together on the titanium-containing solid component a). This usually occurs at from 0 to 150° C., in particular from 20 to 90° C., and pressures of from 1 to 100 bar, in particular from 1 to 40 bar.

The cocatalysts b) and, if used, c) are preferably used in such an amount that the atomic ratio of aluminum from the aluminum compound to titanium from the titanium-containing solid component a) is from 10:1 to 800:1, in particular from 20:1 to 200:1, and the molar ratio of the aluminum compound and the electron donor compound c) used as cocatalyst is from 1:1 to 250:1, in particular from 10:1 to 80:1.

The catalyst systems of the present invention are used for preparing polymers of $C_2$–$C_{10}$-alk-1-enes. They are particularly well suited to the preparation of polymers of propylene and ethylene, i.e. corresponding homopolymers and copolymers of these monomers together with other $C_2$–$C_{10}$-alk-1-enes. The proportion of the monomers propylene or ethylene in the copolymers is here at least 50 mol %.

For the purposes of the present invention, $C_2$–$C_{10}$-alk-1-enes are, inter alia, ethylene, propylene, 1-butene, 1-pentene, 1-hexene, 1-heptene or 1-octene, with particular preference being given to the comonomers ethylene, propylene and 1-butene.

However, the catalyst systems of the present invention can also be used for preparing polymers of other $C_2$–$C_{10}$-alk-1-enes, for example for preparing homopolymers or copolymers of 1-butene, 1-pentene, 1-hexene, 1-heptene or 1-octene.

Preference is given to using the catalyst system of the present invention for preparing polymers consisting of from 50 to 100 mol % of propylene, from 0 to 50 mol %, in particular from 0 to 30 mol %, of ethylene and from 0 to 20 mol %, in particular from 0 to 10 mol %, of $C_4$–$C_{10}$-alk-1-enes. The sum of the molar % is always 100.

The preparation of such polymers of $C_2$–$C_{10}$-alk-1-enes can be carried out in the customary reactors used for the polymerization of $C_2$–$C_{10}$-alk-1-enes either batchwise or preferably continuously, for example as a suspension polymerization or preferably as a gas-phase polymerization. Suitable reactors are, inter alia, continuously operated stirred reactors containing a fixed bed of finely divided polymer which is customarily kept in motion by means of suitable agitators. Of course, the reaction can also be carried out in a plurality of reactors connected in series (reactor cascade). The reaction time is very dependent on the reaction conditions selected in each case. It is normally from 0.2 to 20 hours, usually from 0.5 to 10 hours.

The polymerization reaction is advantageously carried out at from 20 to 150° C. and pressures of from 1 to 100 bar. Preference is here given to temperatures of from 40 to 100° C. and pressures of from 10 to 50 bar. The molar mass of the polyalk-1-enes formed can be controlled by addition of regulators customary in polymerization technology, for example hydrogen, and can be set over a wide range. It is also possible to make concomitant use of inert solvents such as toluene or hexane, inert gas such as nitrogen or argon and relatively small amounts of polypropylene powder.

The propylene homopolymers and copolymers obtained with the aid of the catalyst system of the present invention are obtainable in the molar masses customary for polyalk-1-enes, with polymers having molar masses (weight average) of from 20,000 to 500,000 being preferred. Their melt flow indices at 230° C. and under a weight of 2.16 kg, in accordance with DIN 53 735, are in the range from 0.1 to 100 g/10 min, in particular in the range from 0.5 to 50 g/10 min.

Compared with the catalyst systems known hitherto, the catalyst system of the present invention displays an increased productivity and an excellent stereospecificity, particularly in the case of gas-phase polymerization. The polymers obtained in this way also have a high bulk density, low heptane- and xylene-soluble fractions and a low residual chlorine content.

Owing to their good mechanical properties, the propylene polymers prepared using the catalyst system of the present invention are particularly suitable for the production of films, fibers and moldings.

EXAMPLES

Example 1 a) Preparation of the Titanium-containing Solid Component (1)

In a first stage, finely divided, silica gel ($SiO_2$) having a particle diameter of from 20 to 45 μm, a pore volume of 1.5 cm$^3$/g and a specific surface area of 260 m$^2$/g was admixed with a solution of n-butyloctylmagnesium in n-heptane, with 0.3 mol of the magnesium compound being used per mol of $SiO_2$. The finely divided silica gel additionally had a pH of 6.5, a mean particle size of the primary particles of 3–5 μm and voids and channels having a diameter of 3–5 μm, with the macroscopic proportion by volume of the voids and channels in the total particle being about 15%. The solution was stirred at 95° C. for 30 minutes, then cooled to 20° C., after which 10 times the molar amount, based on the organomagnesium compound, of hydrogen chloride was passed in. The individual components were here reacted in 170 ml of ethylbenzene as solvent. After 60 minutes, the reaction product was admixed while stirring continually with 3 mol of ethanol per mol of magnesium. This mixture was stirred at 80° C. for 0.5 hours and then admixed with 7.2 mol of titanium tetrachloride and 0.5 mol of di-n-butyl phthalate, in each case based on 1 mol of magnesium. The mixture was subsequently stirred for 1 hour at 100° C.; the solid thus obtained was filtered off and washed once with ethylbenzene.

The resulting solid was extracted for 2 hours at 125° C. with a 10% strength by volume solution of titanium tetrachloride in ethylbenzene. The solid product was then separated from the extractant by filtration and washed with n-heptane until the extractant contained only 0.3% by weight of titanium tetrachloride.

The titanium-containing solid component contained 3.6% by weight of Ti 7.1% by weight of Mg 27.9% by weight of Cl.

The particle diameter was determined by Coulter Counter analysis (particle size distribution of the silica gel particles); the pore volume and the specific surface area were determined by nitrogen adsorption in accordance with DIN 66131 or by mercury porosimetry in accordance with DIN 66133. The mean particle size of the primary particles, the diameter of the voids and channels and their macroscopic proportion by volume were determined with the aid of scanning electron microscopy or electron probe microanalysis, in each case on particle surfaces and on particle cross sections of the silica gel. The pH of the silica gel was determined by means of the method described in S. R. Morrison, "The Chemical Physics of Surfaces", Plenum Press, New York [1977] on pages 130 and 131.

b) Polymerization of Propylene

The polymerization was carried out in the gas phase in the presence of hydrogen as molecular weight regulator in an autoclave reactor fitted with a stirrer and having a utilizable capacity of 10 l.

Gaseous propylene in the presence of 8 liters of hydrogen was introduced into the gas-phase reactor at 70° C. and a pressure of 28 bar. Polymerization was carried out at a residence time of 1 hour with the aid of the titanium-containing solid component a) described in Example 1 a, with 100 mg of the titanium-containing solid component a), 10 mmol of triethylaluminum and 1 mmol of dimethoxy-isobutylisopropylsilane being used as cocatalyst.

After the gas-phase polymerization was complete, a propylene homopolymer having a melt flow index of 11.4 g/10 min. at 230° C. and 2.16 kg (in accordance with DIN 53 735) was obtained.

Table 2 below shows, for the propylene homopolymer obtained, the productivity of the catalyst system used (amount of polymer obtained in gram/amount of titanium-containing solid component used in gram), the proportions of xylene- and heptane-soluble material, the chlorine content, the melt flow index and the bulk density.

Comparative Example A

A titanium-containing solid component was first prepared and propylene was then polymerized under identical conditions except that in the preparation of the titanium-containing solid component a) the ethylbenzene solvent was replaced by the same amount of n-heptane.

Table 1 below shows, for the Example 1 according to the present invention and for Comparative Example A, the solvent used in the preparation of the titanium-containing solid component a), the magnesium compound used, the support used (with the proportion by volume of the pores), the extraction time in the second step in the preparation of the titanium-containing solid component a) and its magnesium, titanium and chlorine contents.

Table 2 contains the data in respect of the productivity of the catalyst system used, the proportions of xylene- and heptane-soluble material in the propylene homopolymer obtained and its chlorine content, melt flow index and bulk density.

Examples 2 to 4 and Comparative Examples B and C

In all further Examples 2 to 4 and Comparative Examples B and C, a titanium-containing solid component was first prepared and propylene was then polymerized under identical conditions except that either the solvent in the preparation of the titanium-containing solid component a), the extraction time, the magnesium compound used or the support used were varied as shown in Table 1. Furthermore, Table 1 contains the proportions of magnesium, titanium and chlorine in the titanium-containing solid component a).

Table 2 shows, for all examples and comparative examples, the properties of the polymers obtained in respect of the proportion of xylene- and heptane-soluble material, the chlorine content, the melt flow index and the bulk density. In addition, Table 2 also gives data on the productivity of the catalyst system used.

TABLE 1

Titanium-containing solid component -

|  | Solvent in the preparation of the titanium-containing solid component a) | Magnesium compound used | Extracion time [hours] | Support used and its macroscopic proportion by volume of voids in the total particle [%] | Elemental content in the titanium-containing solid component a) [%] | | |
| --- | --- | --- | --- | --- | --- | --- | --- |
|  |  |  |  |  | Mg | Ti | Cl |
| Example 1 | Ethylbenzene | n-Butyloctyl-magnesium | 2 | $SiO_2$, 15 | 7.1 | 3.6 | 27.9 |
| Comparative Example A | n-Heptane | n-Butyloctyl-magnesium | 3 | $SiO_2$, 15 | 7.3 | 3.5 | 28.4 |
| Example 2 | Ethylbenzene | n-Butyloctyl-magnesium | 2 | $SiO_2$, 20 | 7.1 | 3.8 | 28.8 |
| Comparative Example B | n-Heptane | n-Butyloctyl-magnesium | 3 | $SiO_2$, 20 | 7.4 | 3.6 | 28.5 |
| Example 3 | Ethylbenzene | n-Butylethyl-magnesium | 2 | $SiO_2$; 15 | 7.2 | 3.7 | 28.2 |
| Comparative Example C | n-Heptane | n-Butylethyl-magnesium | 3 | $SiO_2$; 15 | 7.3 | 3.5 | 28.4 |
| Example 4 | n-Heptane (80%) and ethylbenzene (20%) | n-Butyloctyl-magnesium | 3 | $SiO_2$; 15 | 7.3 | 3.5 | 28.7 |

TABLE 2

Properties of the propylene polymers obtained -

|  | Productivity [g of polymer/g of titanium-containing solid component] | Xylene-soluble fraction [% by weight] | Heptane-soluble fraction [% by weight] | Chlorine content [ppm] | Melt flow index* [g/10 min] | Bulk density [g/l] |
| --- | --- | --- | --- | --- | --- | --- |
| Example 1 | 17200 | 0.8 | 1.4 | 16 | 11.4 | 430 |
| Comparative Example A | 15900 | 0.8 | 1.6 | 18 | 12.0 | 440 |
| Example 2 | 20200 | 0.7 | 1.3 | 14 | 11.0 | 425 |

TABLE 2-continued

Properties of the propylene polymers obtained

|  | Productivity [g of polymer/g of titanium-containing solid component] | Xylene-soluble fraction [% by weight] | Heptane-soluble fraction [% by weight] | Chlorine content [ppm] | Melt flow index* [g/10 min] | Bulk density [g/l] |
|---|---|---|---|---|---|---|
| Comparative Example B | 17700 | 0.9 | 1.5 | 16 | 12.1 | 425 |
| Example 3 | 16800 | 0.8 | 1.7 | 15 | 11.3 | 440 |
| Comparative Example C | 14100 | 1.0 | 1.7 | 20 | 12.6 | 450 |
| Example 4 | 16300 | 0.8 | 1.5 | 18 | 12.2 | 430 |

*At 230° C. and 2.16 kg, in accordance with DIN 53735

It can be seen from Tables 1 and 2 that concomitant use of an aromatic hydrocarbon as solvent in the preparation of the titanium-containing solid component gives catalyst systems which lead to polymers having reduced xylene- and heptane-soluble fractions and also a decreased chlorine content. The catalyst systems of the present invention display, inter alia, an increased productivity. The extraction time in their preparation can be shortened.

We claim:

1. A catalyst system of the Ziegler-Natta type comprising as active constituents
    a) a titanium-containing solid component which is obtained by reacting a compound of titanium with a compound of magnesium, a halogen, an inorganic oxide as support, a $C_1$–$C_8$-alkanol and a carboxylic ester as electron donor compound,
and also, as cocatalyst,
    b) an aluminum compound and
    c) optionally, a further electron donor compound,
wherein the reaction of the individual components for preparing the titanium-containing solid component a) is carried out in the presence of ethylbenzene as solvent.

2. The catalyst system of claim 1, wherein the inorganic oxide has a pH of from 1 to 6.5, a mean particle diameter of from 5 to 200 μm and voids or channels having a mean diameter of from 1 to 20 μm, which voids or channels have a macroscopic proportion by volume in the total particle in the range from 5 to 30%.

3. The catalyst system of claim 1, wherein the inorganic oxide is spray dried.

4. The catalyst system of claim 1, wherein the inorganic oxide is silica gel ($SiO_2$).

5. The catalyst system of claim 1, wherein the further electron donor compound c) is an organo-silicon compound of the formula (I)

$$R^1{}_n Si(OR^2)_{4-n} \qquad (I),$$

where $R^1$ are identical or different and are each a $C_1$–$C_{20}$-alkyl group, a 5- to 7-membered cycloalkyl group which can in turn bear a $C_1$–$C_{10}$-alkyl group, or a $C_6$–$C_{20}$-aryl or arylalkyl group, $R^2$ are identical or different and are each a $C_1$–$C_{20}$-alkyl group and n is 1, 2 or 3.

6. The catalyst system of claim 1, wherein the aluminum compound b) is a trialkylaluminum compound whose alkyl groups each have from 1 to 8 carbon atoms.

* * * * *